INVENTOR
JOSEPH S. APPLE
BY Arthur Freilich
ATTORNEY

DIGITAL STORAGE REGISTER TRANSFER APPARATUS

Filed April 20, 1964

3 Sheets-Sheet 2

INVENTOR
JOSEPH S. APPLE
BY Arthur Freilich
ATTORNEY

INVENTOR
JOSEPH S. APPLE
BY Arthur Frailich
ATTORNEY

United States Patent Office 3,319,228
Patented May 9, 1967

3,319,228

DIGITAL STORAGE REGISTER TRANSFER APPARATUS

Joseph S. Apple, Canoga Park, Los Angeles, Calif., assignor to The Bunker-Ramo Corporation, Canoga Park, Calif., a corporation of Maryland Filed Apr. 20, 1964, Ser. No. 360,829
7 Claims. (Cl. 340—172.5)

Figure 1:
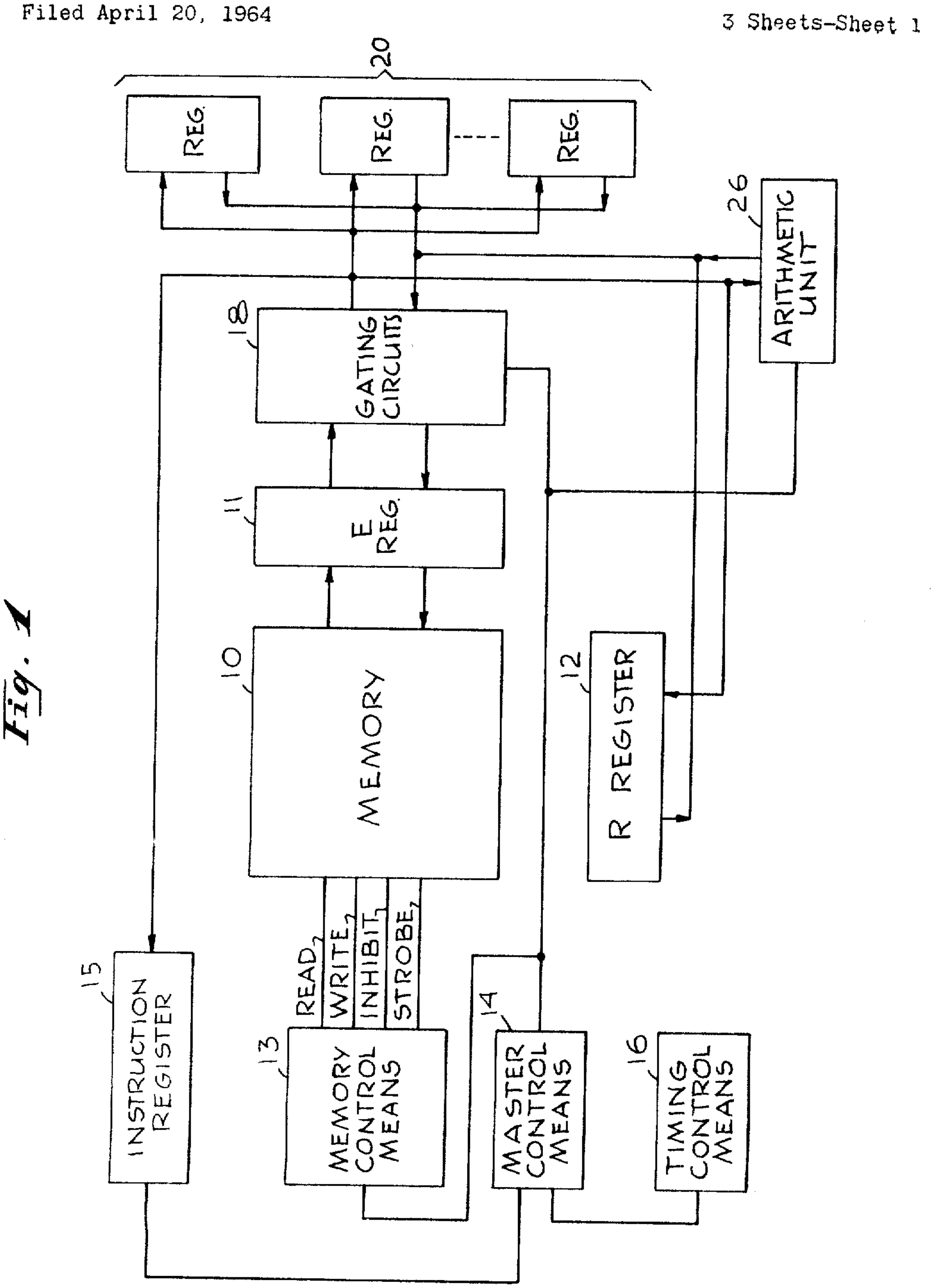

This invention relates generally to digital data processing systems, including digital computer systems, and more particularly to improved means for effecting information transfer between storage registers used therein.

Virtually all known digital data processing, and particularly computer, systems include a plurality of digital storage registers (most often comprised of flip-flops) in addition to a digital memory. Whereas the memory is used to store a very great number of information words, each register can usually only store one such word. A finite time interval, usually on the order of microseconds, is required to access any designated word from the memory before it can be used, but words stored in a register can usually be used immediately.

Registers are used to store both control words and operand words. Control words essentially define the operations to be performed on an operand word. Thus consider, for example, a sequence in which a first control word, defining the memory address of a second control word, is initially accessed from memory. Any word accessed from memory initially enters the memory exchange register from which it is transferred to another register. Assuming that the first control word defines the address of a second control word which comprises an instruction word, the first control word is transferred from the exchange register to a memory address register, thereby permitting the second control word to be entered into the exchange register. The second control word is then transferred to an instruction register. While the instruction word is in the instruction register, a timing device defines a plurality of successive periods. Different operations are performed during each period as designated by the word in the instruction register and by the particular period. The operations can, for example, call for a first operand word to be accessed from memory and transferred from the exchange register to a first arithmetic register and for a second operand word to be accessed from memory and transferred from the exchange register to a second arithmetic register and then for the contents of the first and second arithmetic registers to be added and put in perhaps still another arithmetic register. In addition to the registers thus far recited, many other registers are often employed in the typical computer system. For example, one or more index registers are usually provided which are used for storing words to be used for automatically modifying memory addresses. From what has been said thus far, it should be apparent that in the normal course of computer operation, transfers of information between registers are continually required.

According to conventional computer implementation, appropriate gates couple the output terminals of each register directly to the input terminals of every other register to which the contents of the first register may at some time have to be transferred. If it is assumed that a particular system employs $n_A+n_B$ registers, then if direct transfers are to be effected between all registers, exactly $(n_A+n_B-1)(n_A+n_B)$ transfer gates per bit are required. Of course, it may not be necessary to provide direct transfer paths between all registers. Some transfer paths may be required so infrequently that rather than implement them, it could in a particular case be economically advantageous to effect those transfers indirectly through other registers. Of course indirect transfers require greater processing time thereby limiting the overall capabilities of the system.

In view of the foregoing, it is an object of the present invention to provide means for interconnecting registers used in data processing systems which means are structurally simpler and consequently less expensive and more reliable.

Briefly, in accordance with the present invention, the plurality of registers are segregated into first and second groups which are interconnected in a circular arrangement through first and second busses. That is, the output terminals of all of the registers in the first group are connected to the first bus and the output terminals of all of the registers in the second group are connected to the second bus. The inputs to the registers in the first group are derived from the second bus and the inputs to the registers in the second group are derived from the first bus.

Although the present invention has signficant utility regardless of the type of register flip-flops employed, it is particularly advantageous in systems employing register flip-flops having only a single output terminal, e.g., as disclosed in U.S. patent application Ser. No. 360,816 filed on Apr. 20, 1964, by Joseph S. Apple and assigned to the same assignee as the present application. More particularly, whereas most conventional flip-flop circuits used to store digital information are of the Eccles-Jordan type and have both true and complementary output terminals, attempts made to construct less costly digital systems have resulted in the provision of simpler and less costly flip-flops having only one output terminal. Although costs have thus been reduced, other problems have been introduced. For example, in order to perform certain arithmetic operations, such as subtraction, with respect to numbers stored in a pair of registers, it is usually desirable to have the complement of one of those numbers readily available. Of course, reasonably complex inverting circuit arrangements could be provided with each flip-flop but this would probably add as much to the system cost as was taken away by using less complex flip-flops. U.S. patent application Ser. No. 360,830 filed on Apr. 20, 1964, by Joseph S. Apple, and assigned to the same assignee as the present application, discloses relatively inexpensive circuit means for selectively complementing the output of a single output terminal flip-flop in response to a true or false control signal.

The preferred embodiment of the present invention, which incorporates circuit arrangements of the general type shown in the above-cited patent applications, permits the contents of any system register to be put on the bus coupled to the output thereof and permits any number of other system registers to simultaneously accept the information on the bus. As a consequence of using a circular bus arrangement for transferring information between registers, approximately $(n_A+n_B)^2$ direct transfer paths are provided but approximately only $(n_A+n_B)$ transfer gates are required.

An extremely important feature of the preferred embodiment of the invention is the provision of an adder circuit which derives its inputs directly from the outputs of the first and second busses. As a consequence, the sum or difference of two information words on the first and second busses is always available at the adder circuit output. Additional gating means are incorporated in each bus to enable either word coupled to the bus input or the adder output to be selected. Although many different types of adder circuits could be employed in the illustrated embodiment of the invention, a particularly suitable circuit is disclosed in U.S. patent application Ser. No. 372,600 filed on June 4, 1964, now abandoned, by Joseph S. Apple and assigned to the same assignee as the present application.

Figure 2A:
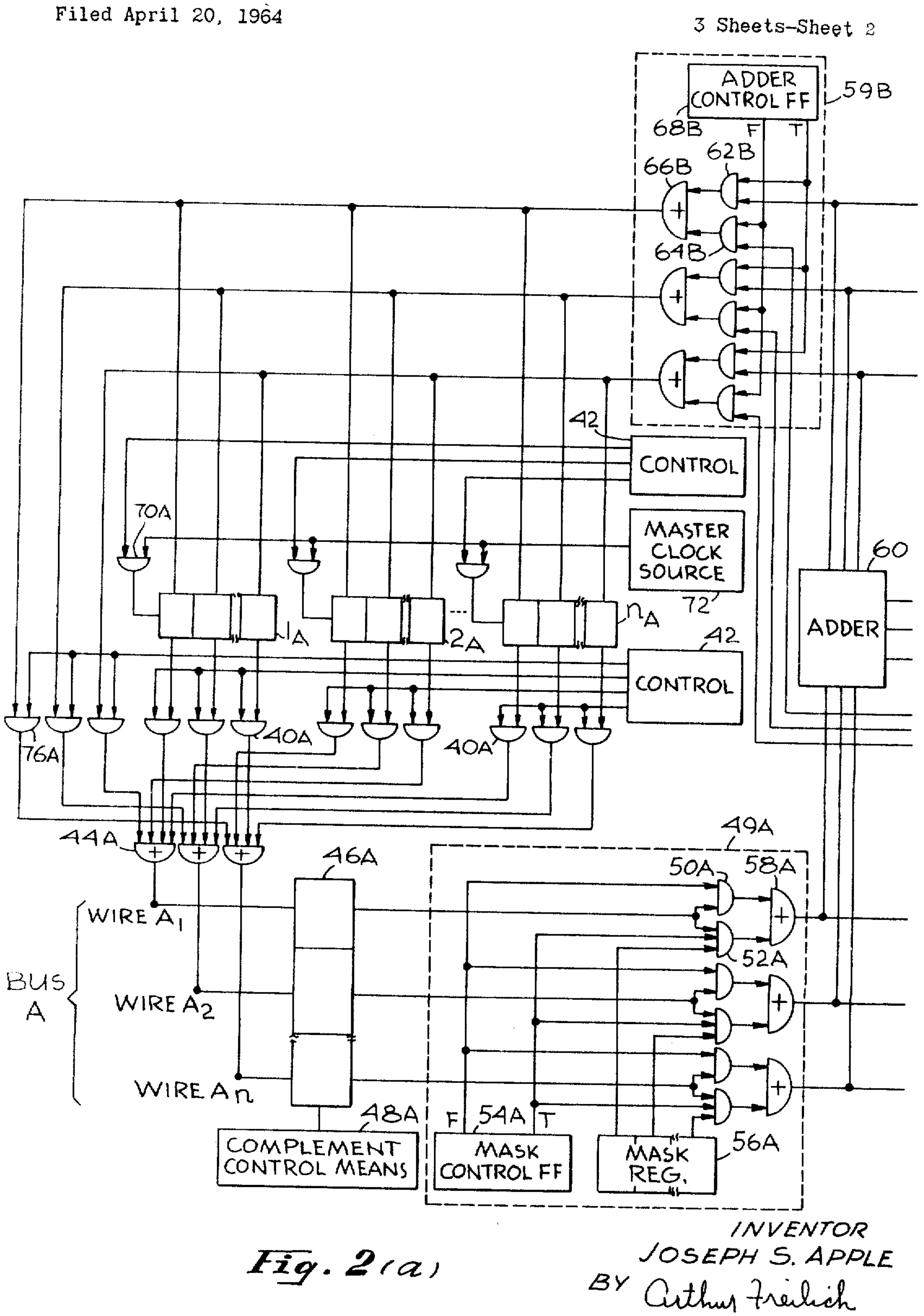
Figure 2B:
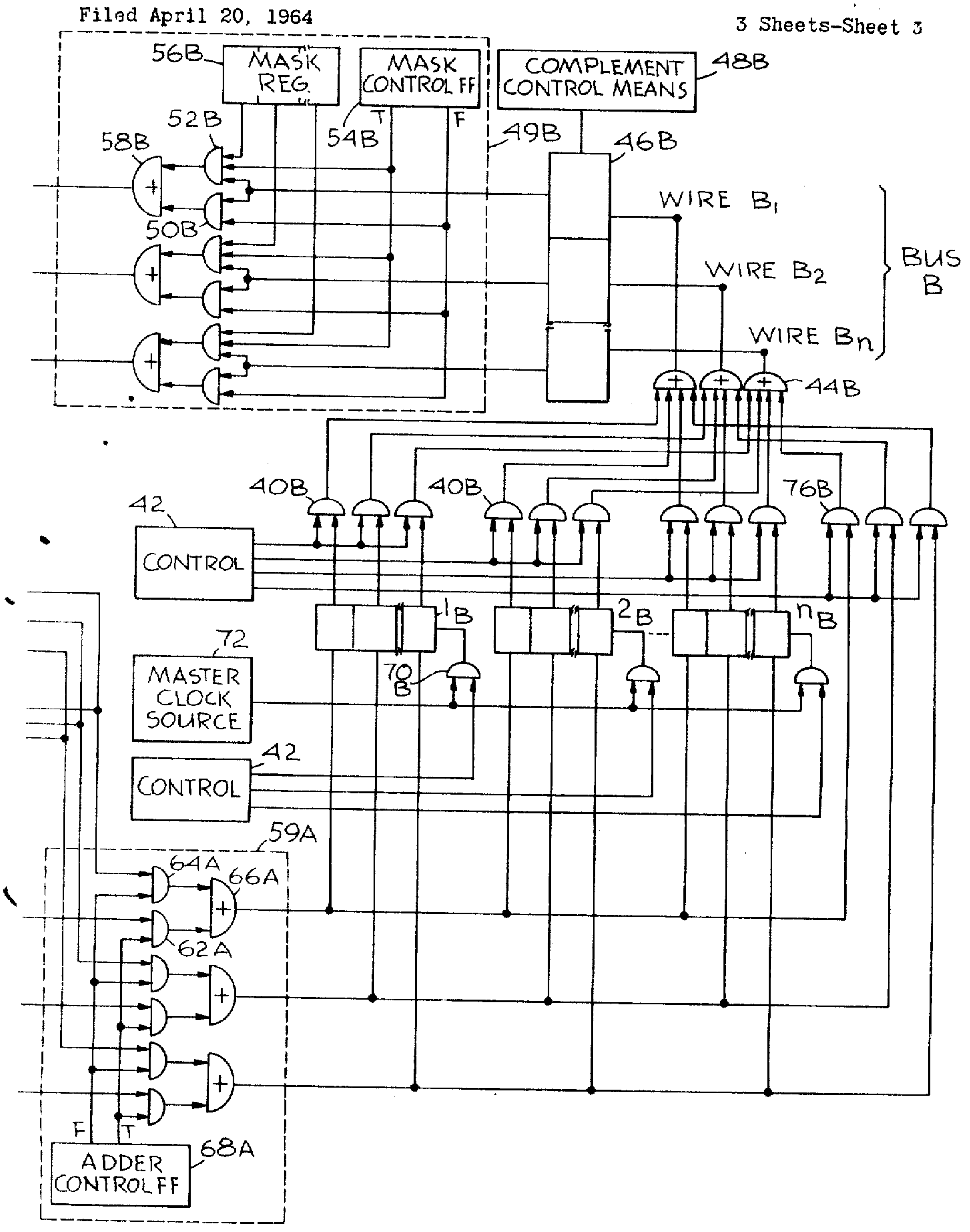

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a block diagram of a typical computer system generally illustrating how information is transferred between portions thereof; and FIGURES 2(*a*) and (*b*) comprise a block diagram of a preferred embodiment of the present invention.

Attention is now called to FIG. 1 of the drawings which comprises a block diagram illustrating portions of a typical digital computer system. The system includes a digital memory 10 having associated therewith an E register 11 and an R register 12. The E register is provided for exchanging information with the memory 10. That is, in order to enter an information word into the memory, it is initially entered into the E register. Conversely, when a word is accessed from memory, it is entered into the E register. The particular location from which a word is accessed from the memory or into which it is entered, is defined by an address stored in the R register. Whether a word is accessed from the memory or entered therein is determined by a memory control means 13 which at different times defines a read phase, a write phase, an inhibit phase, or a strobe phase, by appropriately applying signals to each of its four output terminals. Inasmuch as the detailed operation of digital memories and the functions performed during each of these phases are well known in the art, they will not be further discussed herein. The memory control means 13 is in turn controlled by a master control means 14 which is responsive to both an instruction word stored in an instruction register 15 and to states defined by a timing control means 16.

A plurality of gating circuits 18 couple the output of the E register to the R register and to each of a plurality of other registers 20. The gating circuits 18 control the transfer of words between the E register, R register, instruction register, and each of the registers 20. The gating circuits 18 are controlled by the master control means 14.

An arithmetic unit 26 is also controlled by the master control means 14 and functions to perform arithmetic operations upon words stored in any of the various registers. Thus, the input of the arithmetic unit 26 is derived from the output of the gating circuits 18 and the output of the arithmetic unit 26 is connected to the input of the gating circuit 18.

As mentioned in the introduction to the present specification, in the normal course of operation, transfers between the various registers are very frequently required. The hardware complexity of the gating circuit 18 determines the convenience with which the transfers between registers can be made. That is, if the output of each register is connected to the input of each other register through a different gate, then information transfers can be effected rapidly and easily. However, the provision of such a great number of gates would very likely be unnecessarily expensive inasmuch as some transfer paths would be used relatively infrequently. Gating circuit 18 could be of minimal complexity and consequently minimal expense if speed and convenience of operation could be sacrificed. In most prior art digital computer systems, a compromise design is usually employed in which a reasonable number of direct information transfer paths are provided at a reasonable cost. The present invention is directed toward the provision of a gating organization which effectively provides direct transfer paths between each register and every other register thereby permitting very convenient and fast operation and yet which reduces hardware complexity and the excessive cost associated therewith.

Attention is now called to FIG. 2 which illustrates a preferred embodiment of the present invention. In accordance with the invention, all of the digital storage registers normally employed in a conventional system are segregated into two groups of registers. The first group of registers, i.e., group A, is comprised of registers identified as $\mathbf{1}_A$, $\mathbf{2}_A$, . . . $n_A$. The second group of registers, i.e., group B, includes registers identified as $\mathbf{1}_B$, $\mathbf{2}_B$, . . . $n_B$. It is contemplated that each of the registers be comprised of flip-flop stages. Generally, each register will have a number of stages equal to the number of bits in the word normally employed in the system. However, particular registers can be either shorter or longer than one word length. Conventional flip-flop structures can be used in each stage in accordance with the invention but, however, maximum advantage can be taken of the hardware reduction afforded by the present invention by utilizing flip-flops which have a single input terminal and a single output terminal and yet which have the ability to retain information indefinitely. One such flip-flop structure is disclosed in the aforecited U.S. patent application Ser. No. 360,816.

The output terminal of each register flip-flop stage in group A is connected to the input of a different AND gate 40A. A second input to each AND gate 40A is derived from a master control means 42 corresponding to control means 14 of FIG. 1. A different control means output terminal is connected to the inputs of AND gates associated with different group A registers. (It is pointed out that although more than one block has been used in FIG. 2 to represent the control means 42, this has been done for the sake of clarity only and actually all the control means would form part of the same structure; likewise with a master clock source 72.) That is, a first output terminal of control means 42 is connected to the inputs of AND gates 40A connected to the outputs of stages of register $\mathbf{1}_A$. Similarly, a second output terminal of control means 42 is connected to AND gates 40A connected to the outputs of stages of the register $\mathbf{2}_A$. The outputs of correspondingly positioned AND gates 40A are connected to the input of a common OR gate 44A. Thus, the AND gates 40A which are connected to the output of the least significant stage of the group A registers are all connected to a common OR gate 44A. The output of each of the different OR gates 44A is connected to a different wire or transfer path in bus A. Thus, the output of the first OR gate 44A is connected to bus wire $A_1$, the output of the second OR gate 44A is connected to the bus wire $A_2$, etc.

Each bus wire A is connected to the input of a different amplifying and complementing circuit 46A. Each amplifying and complementing circuit provides an amplified output signal which represents either the true or complemented state of the input signal applied thereto. In the event that the complement control means 48A provides a false control signal to the control input terminal of circuits 46A, then the circuits 46A will provide true output signals, i.e., the output signals will correspond to the input signals. In the event that the complement control means provides a true control signal, then the circuits 46A will provide complemented output signals, i.e., the output signals will be the logical inverse of the input signals.

The output of each of the circuits 46A is connected to the input of a different stage of a masking apparatus 49A. Each stage of the masking apparatus 49A includes a pair of AND gates comprised of gates 50A and 52A. Gates 50A and 52A are controlled by a mask control flip-flop 54A. The false output terminal of the mask control flip-flop 54A is connected to the input of all of the gates 50A and the true output terminal of the flip-flop 54A is connected to the input of all of the gates 52A. In addition, a mask register 56A is provided which has a number of stages equal to the number of bus wires employed. The output of each stage of the mask register is connected to the input of a different one of the gates 52A.

When the mask control flip-flop is false, AND gates 50A will be enabled to thus pass either the true or complemented output signals provided by circuit 46A to the input of an OR gate 58A. On the other hand, when the mask control flip-flop 54A defines a true state, AND gates 50A will be disabled and the AND gates 52A will pass the output signals provided by circuits 46A only if the corresponding stage of the mask register 56A is true. The aforecited U.S. patent application Ser. No. 360,830 discloses circuit apparatus which can be used for performing both the complementing and masking functions useful in the embodiment of FIG. 2 herein.

The output of each of the OR gates 58A is connected both to the input of a different stage of an adder control apparatus 59A and to one set of inputs of an adder circuit 60. The aforecited U.S. patent application Ser. No. 372,600, now abandoned, discloses a suitable adder circuit. Each stage of the adder control apparatus 59A includes a pair of AND gates 62A and 64A whose outputs are connected to the input of an OR gate 66A. Both AND gates 62A and 64A are controlled by an adder control flip-flop 68A. The true output terminal of the adder control flip-flop 68A is connected to the input of all of gates 62A and the false output terminals of the flip-flop 68A is connected to the input of all of gates 64A. The output of each OR gate 58A is connected to the input of a different AND gate 62A. The second input to each AND gate 64A is derived from the output of the adder circuit 60.

As a consequence of the above-recited connections, the adder control flip-flop 68A can selectively enable AND gate 62A or AND gate 64A but not both. When the adder control flip-flop 68A is false, the output of the adder circuit 60 is applied to the inputs of OR gate 66A. On the other hand, when the adder control flip-flop 68A is true, the outputs of the OR gates 58A are coupled to the inputs of OR gates 66A. The outputs of OR gates 66A represent the outputs of bus A which can be entered into any of the registers in group B.

More particularly, the output of each OR gate 66A is connected directly to the information input terminal of each of the correspondingly positioned stages in the registers in group B. In accordance with the circuit disclosed in the previously cited patent application Ser. No. 360,816, each flip-flop stage of the registers will accept the information applied to the information input terminal thereof only when an enabling signal is applied to the clock input terminal thereof by a clock control gate 70B. The output of a master clock source 72 is connected to the input of each of the AND gates 70B whose outputs are each connected to the clock input terminal of a different one of the registers. A different control means 42 output terminal is connected to the input of each of the clock control gates 70B. Thus, only when the appropriate control means output terminal enables the AND gate 70B concurrently with the generation of a clock pulse by the master clock source 72, is the information presented at the output of the OR gates 66A entered into the register stages.

The output terminals of the register stages of the group B registers are connected to the wires of bus B in the identical manner as the outputs of the register stages of group A are connected to the wires of bus A. Amplifying and complementing circuits 46B, masking apparatus 49B, and adder control apparatus 59B, are incorporated into bus B in the same manner as has been detailed with respect to bus A.

Thus, it should be appreciated that a word stored in any one of the registers can be put on the bus associated therewith through gates 40 and 44 which word can be selectively entered in to one or more of the registers in the other group. Moreover, inasmuch as the output of one register in each group can be simultaneously applied to each of the busses, simultaneous information exchange between registers in different groups can be effected.

Thus far, information transfers between registers in different groups only have been considered. Although the total number of registers in the system are preferably grouped such that most transfers out of each register are directed into registers in the opposite group, it is recognized that in order to enable the system to have maximum utility, means should be provided for enabling information to be transferred from any register to another register in the same group. In order to enable such transfers to be effected, the outputs of OR gates 66A of bus A are connected directly to the inputs of AND gates 76B whose outputs in turn are connected to the inputs of OR gates 44B which of course feed the wires of bus B. Similarly, the outputs of the bus B wires are connected through AND gates 76A to the inputs of the OR gates 44A.

By connecting the outputs of both gates 58A and 58B to the inputs of the adder circuit 60, the sum or difference (recalling that the outputs of gates 58A and 58B can either be the true or complement of the words applied to the bus inputs) of the words existing on both busses is always available at the adder output terminals. The sum or difference can of course be entered into any of the registers by properly controlling the various control terminals.

From the foregoing, it should be appreciated that means have been introduced herein for quickly and inexpensively transferring information between digital storage registers employed in data processing systems. It should be appreciated that transfer gate complexity is minimized by the apparatus introduced herein inasmuch as exactly $(n_A+n_B)^2$ sets of transfer paths are provided while approximately only $n_A+n_B$ sets of transfer gates (i.e. gates 40A and 40B) are required. Although the gating hardware has been substantially reduced over that which would be required in a conventional system having as many direct transfer paths, no substantial time penalty is paid for this reduction in cost and hardware complexity. For example, note that a transfer from a register in group A to a register in group B requires only one clock time. That is, assuming that a register in group A puts information on bus A, that information can be entered into any other group A or group B register upon the generation of a subsequent clock pulse by the master clock source source 72. As an example, consider that it is desired to transfer the information stored in register $n_B$ to three different registers in group A. These transfers can of course all be effected in one clock time (i.e., no storage is required anywhere in the transfer path) and through one transfer gate rather than the three such gates normally required in conventional systems.

From the foregoing, it should be appreciated that a structurally simple and relatively inexpensive apparatus has been disclosed herein for transferring information between storage registers employed in a digital data processing or computing system.

The embodiments of the invention in which an exclusive property or privilege is claimed are defined as follows:

1. In a digital system including first and second groups of digital storage registers, each register comprised of a plurality of stages, each stage having at least one input terminal and one output terminal, apparatus for transferring information between registers, said apparatus comprising:

a first bus having input and output means;

a second bus having input and output means;

first gating means connecting said output terminals of each register in said first group to said first bus input means;

second gating means connecting said first bus output means to said input terminals of each register in said second group;

third means connecting said output terminals of each register in said second group to said second bus input means;

fourth means connecting said second bus output means to said input terminals of each register in said first group;

a source of control signals;

means applying said control signals to said first and third gating means for coupling signals representing information stored in selected registers to said first and second bus input means; and first and second circuit means respectively incorporated in said first and second busses connected between the input and output means thereof and responsive to said control signals and to said signals representing said information for selectively providing signals representing either said information or the logical complement thereof at the bus output means.

2. In a digital system including first and second groups of digital storage registers, each register comprised of a plurality of stages, each stage having at least one input terminal and one output terminal, apparatus for transferring information between registers, said apparatus comprising:

a first bus having input and output means;

a second bus having input and output means;

first gating means connecting said output terminals of each register in said first group to said first bus input means;

second gating means connecting said first bus output means to said input terminals of each register in said second group;

third means connecting said output terminals of each register in said second group to said second bus input means;

fourth means connecting said second bus output means to said input terminals of each register in said first group;

an adder circuit means having first and second input means and an output means;

means respectively coupling the output of said first and second bus input means to said first and second adder circuit input means; and means for selectively coupling said adder circuit output means to the input of said first and second bus circuit output means.

3. The system of claim 1 including an adder circuit means having first and second input means and an output means;

means respectively coupling the output terminals of said circuit means incorporated in said busses to said first and second adder circuit input means; and means for selectively coupling said adder circuit output means to the input of said first and second bus circuit output means.

4. In a digital system including first and second groups of digital storage registers, each register comprsied of a plurality of stages, each stage having at least one input terminal and one output terminal, apparatus for transferring information between registers, said apparatus comprising:

a first bus having input and output means;

a second bus having input and output means;

first gating means connecting said output terminals of each register in said first group to said first bus input means;

second gating means connecting said first bus output means to said input terminals of each register in said second group;

third means connecting said output terminals of each register in said second group to said second bus input means;

fourth means connecting said second bus output means to said input terminals of each register in said first group;

a source of control signals;

means applying said control signals to said first and third gating means for coupling signals representing information stored in selected registers to said first and second bus input means;

a mask register having a plurality of stages each having an output terminal; and mask circuit means incorporated in each bus connected between the input and output means thereof and responsive to said control signals and to the state of each of said mask register stages for inhibiting information transfer between said bus input and output means.

5. In a digital system including first and second groups of digital storage registers, each register comprised of a plurality of stages, each stage having at least one input terminal and one output terminal, apparatus for transferring information between registers, said apparatus comprising:

a first bus including a plurality of information transfer paths, each path having input and output means coupled thereto;

a second bus including a plurality of information transfer paths, each path having input and output means coupled thereto;

first means connecting each different set of corresponding output terminals of each register in said first group to the input means of a different first bus transfer path;

second means connecting each different first bus transfer path output means to a different set of corresponding input terminals of each register in said second group;

third means connecting each different set of corresponding output terminals of each register in said second group to the input means of a different second bus transfer path; and fourth means connecting each different second bus transfer path output means to a different set of corresponding input terminals of each register in said first group.

6. In combination with first and second groups of digital storage registers, each including a plurality of flip-flop stages, each of said flip-flop stages having an information input terminal, a clock input terminal, and a single output terminal;

first and second busses each including a plurality of transfer paths, each path having an input terminal, an output terminal, and at least one circuit stage therebetween;

a plurality of output gating means each connecting said output terminals of corresponding flip-flop stages in said first group to the input means of a different first bus transfer path;

a plurality of output gating means each connecting said output terminals of corresponding flip-flop stages in said second group to the input means of a different second bus transfer path;

means connecting each different first bus transfer path output means to a different set of corresponding information input terminals of each register in said second group;

means connecting each different second bus transfer path output means to a different set of corresponding information input terminals of each register in said first group;

a source of clock signals;

each of said flip-flop stages being responsive to the application of clock pulses to the clock input terminal thereof for storing signal representations applied to the information input terminals thereof.

7. The combination of claim 6 including a source of control signals; and wherein said circuit stage is responsive to said control signals for selectively providing at said bus output terminals signals either representing information coupled to said transfer path input terminals or the complement thereof.

References Cited by the Examiner

UNITED STATES PATENTS

| | | | |
|---|---|---|---|
| 3,215,987 | 11/1965 | Terzian | 340—172.5 |
| 3,231,863 | 1/1966 | Ulfsparre | 340—172.5 |
| 3,242,467 | 3/1966 | Lamy | 340—172.5 |

ROBERT C. BAILEY, *Primary Examiner.*

P. J. HENON, *Examiner.*